United States Patent
Lee

[15] 3,665,390
[45] May 23, 1972

[54] SPEED INDICATING DEVICE

[72] Inventor: Robert E. Lee, North Branch, Minn. 55056
[22] Filed: May 13, 1970
[21] Appl. No.: 36,957

[52] U.S. Cl..............................340/62, 123/103 B, 180/106
[51] Int. Cl................................................B60q 1/54
[58] Field of Search..........................340/62; 180/106, 110; 123/103 B, 102

[56] References Cited

UNITED STATES PATENTS

| | | | |
|---|---|---|---|
| 2,822,881 | 2/1958 | Treharne | 180/110 |
| 3,464,275 | 9/1969 | Mueller | 180/110 |
| 2,529,243 | 11/1950 | Brown et al. | 123/103 B |
| 3,105,222 | 9/1963 | Adler | 340/63 |

*Primary Examiner*—John W. Caldwell
*Assistant Examiner*—Glen R. Swann, III
*Attorney*—Robert M. Dunning

[57] ABSTRACT

A speed indicating device is provided which may be adjusted to indicate a maximum and a minimum speed as the vehicle is in motion. A pair of switches or contacts are provided which indicate maximum and minimum speeds which may be perhaps ten miles per hour different. A fan or propeller actuates an arm which will oscillate between contacts depending upon the vehicle speed. However, the contacts are adjustable through operation of the arm. The normally fixed contact support may be released, so that the vehicle speed may be increased to a predetermined maximum, and then the contact support may be locked to provide an indication when the desired speed is exceeded.

10 Claims, 4 Drawing Figures

Patented May 23, 1972 3,665,390

INVENTOR
ROBERT E. LEE
BY *Robert M. Dunning*
ATTORNEY

3,665,390

SPEED INDICATING DEVICE

This invention relates to an improvement in speed indicating device which is designed for use on a motor vehicle, and which may be readily adjusted to compensate for the driving speed regulations in various states, cities and the like.

BACKGROUND OF THE INVENTION

A great number of types of speed regulating devices have been mounted on vehicles and employed for lighting a light, or operating a signal when the vehicle is traveling above a certain predetermined speed. Some of these devices are controlled by a suitable switch member mounted upon the shaft of the speedometer. One of the problems which results from such an arrangement resides in the fact that any such member mounted upon the speedometer shaft has a tendency to reduce the accuracy of the speedometer. When a member is provided on the speedometer shaft capable of closing a circuit at a predetermined maximum speed, friction is usually involved, and the speedometer may not register properly after the indicated speed has been obtained.

Other means have been provided which are controlled by the actual speed of the vehicle as measured by incoming air. One of the problems with such devices lies in the fact that such devices are dependent upon the wind for their accuracy. In other words, if the vehicle is bucking a head wind in its operation, the maximum speed indicator will function prematuraly. On the other hand, if the vehicle is moving downwind, the desire maximum speed may be exceeded before the signal is actuated.

I have found that the speed of the vehicle is almost directly proportional to the speed of rotation of the cooling fan mounted forwardly of the engine, as this cooling fan is normally directly connected to the crank shaft of the vehicle. Accordingly, by providing a device which is controlled by the force of air directly rearwardly by the cooling fan, the speed of the vehicle may be accurately determined.

One of the main objections to previous devices lies in the fact that they may be usually only easily set according to existing laws in a predetermined state or area and cannot be easily adjusted at will. However, many states require that speed be reduced by 10 miles an hour during darkness. Furthermore, some highways permit a range of speed of 65 to 75 miles an hour, while other highways are limited to a much lower rate of speed. Accordingly, a device which is present to provide an indication when the car is traveling at a speed of, for example, 60 miles an hour, is of little value when the car is traveling on a highway where the maximum speed is 70 or 75 miles an hour.

SUMMARY OF THE INVENTION

A feature of the present invention resides in the provision of a speed indicating device capable of producing a signal when a predetermined speed is exceeded, and which will provide a second indication when the speed is decreased by an increment of perhaps 10 miles per hour. The device is readily adjustable by the driver while the car is traveling over the road. An auxiliary fan is provided which is controlled by the flow of air from the cooling fan of the vehicle. The fan is connected by a spring to a relatively fixed member, and means is provided so that when the air flow exceeds a predetermined amount, a switch will be closed to indicate a suitable signal. A device is also arranged so that when the speed of the vehicle is below a predetermined minimum, a second signal is energized. The adjustment of the signal actuating mechanism is controlled by a brake which normally holds the switch indicating mechanism in proper relation to the fan. By releasing this brake, the speed indicating mechanism may be varied according to desired conditions.

In other words, the device includes an indicating means which is held in a fixed relation by a suitable brake. When the brake is released, a disc is free to rotate with the fan or other air actuated device, the position of which is determined by a suitable spring. Stated otherwise, the fan tends to assume a certain position when the vehicle is traveling 40 miles an hour, and tends to assume a different position when the vehicle is traveling 50 or 60 miles per hour. When the brake is released, the operating disc tends to rotate with the fan, and tends to assume a position proportional to the speed of the vehicle. However, when the brake is applied to the disc, the disc remains in a fixed position, and an increase in speed tends to close one contact on the disc, while a decrease in speed tends to close another contact thereupon. Thus, the speed of the vehicle controls circuits in such a manner as to indicate when the speed of the vehicle is excessive of one speed, such as 60 miles an hour, while the other signal functions to provide an indication when the vehicle is traveling at a speed less than 50 miles per hour.

One of the important features of the present invention lies in the ready adjustability of the speeds at which the indicating device will function. By releasing the brake on the control disc, and by increasing the speed of the vehicle to the maximum speed desired, the brake may then be released which will hold the disc in a predetermined fixed position. If the speed is increased, a circuit is closed indicating that the desired speed is being exceeded. If, on the other hand, the speed of the vehicle is decreased by an increment of, perhaps, 10 miles an hour, the low limit indicating light will be energized, showing that the car is traveling below the desired range.

A feature of the present invention resides in the provision of a solenoid actuated device which normally holds the control disc from rotation about its axis. When a suitable switch is actuated by the driver, the brake is released, and the disc is free to rotate until a new speed level has been established. At this point the solenoid is de-energized, and the control disc is held from movement. From this point on, the device functions to indicate a maximum speed, and to indicate a minimum speed which is perhaps 10 miles per hour less than the maximum speed, so that the vehicle operator will be instantly advised when the vehicle exceeds the desired limit, or when the vehicle is operating below the desired speed.

The main feature of the present invention resides in the provision of a device which may be readily adjustable according to the desires of the operator. The control disc on which the switches are mounted is spring loaded in a manner to function at a minimum speed, and the position of the disc is regulated by a normally engaged brake. If it is desired that the speed of the vehicle be maintained between 50 and 60 miles an hour, it is only necessary to disengage the brake, and to drive the vehicle at a speed of 60 miles an hour, at which time the brake is applied. From this time, an increase in speed will close a switch indicating a signal light, and a decrease of 10 miles perhour in speed will close another signal light so as to indicate that the speed is below the desire minimum. Obviously, the signal light may be a bell or other warning member.

These and other objects and novel features of the present invention will be more clearly and fully set forth in the following specification and claims.

Figure 1:
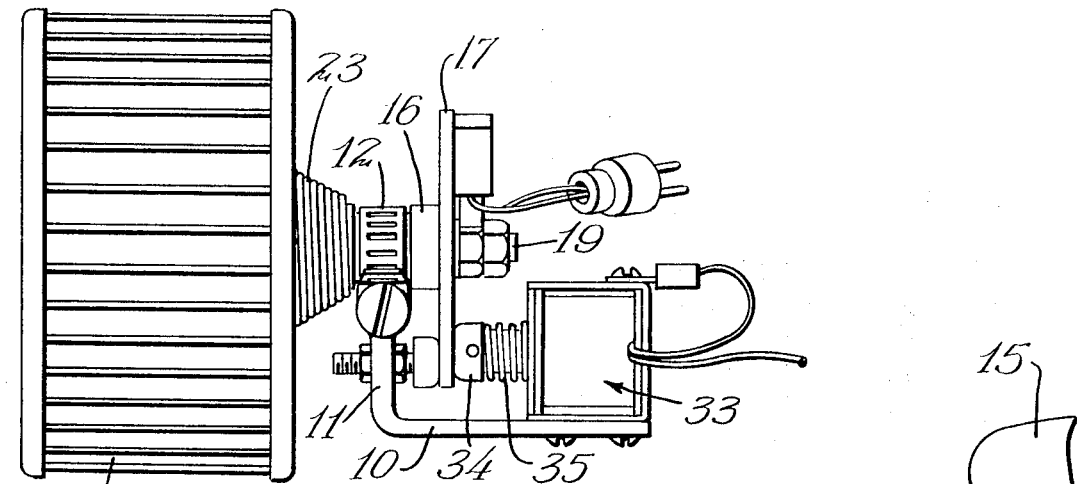
FIG. 1 is a side elevational view of the apparatus showing the general arrangement thereof.

The device includes a bracket 10 having an upturned end 11 supporting a clamp 12. The bracket 10 is connected to the vehicle engine 13 by any suitable means such as by the bolt 14. The bracket 10 is positioned rearwardly of the fan 15 rotated by the vehicle engine. A hub 16 is supported within the fixed clamp 12. A control disc 17 is mounted at one end of the hub 16 and is rotatable relative thereto. A shaft 19 extends through the hub support bearings 20. The bearings, in turn, support the housing of a Torrington fan 21, or its equivalent. A propeller may be used in place of this fan, but the Torrington fan has been found somewhat more accurate.

The fan 21 is urged in one direction by a spring 23 connecting the fan and hub. The shaft 19 is normally held from rotation relative to the fan 21 by means of a bolt 25 so that rotation of the fan 21 causes a similar rotation of the shaft 19.

Figure 2:
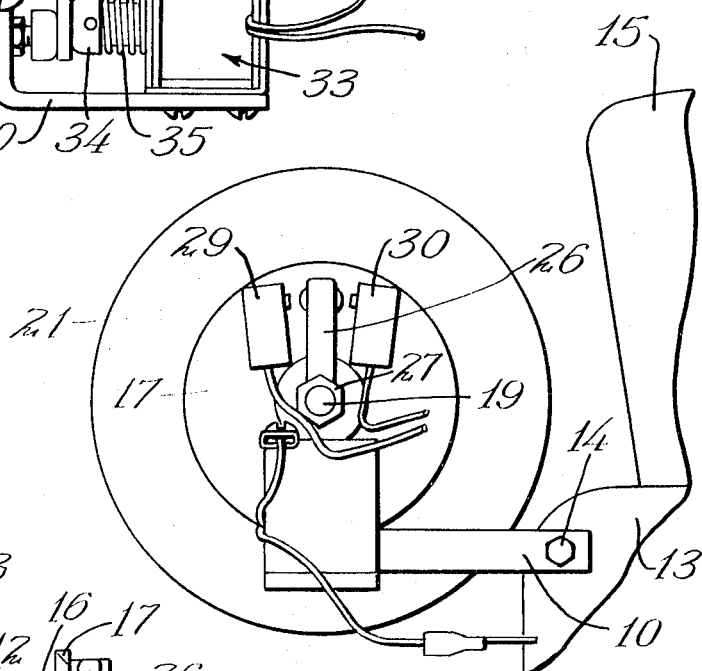
FIG. 2 is an end elevational view of the construction shown in FIG. 1.
Figure 3:
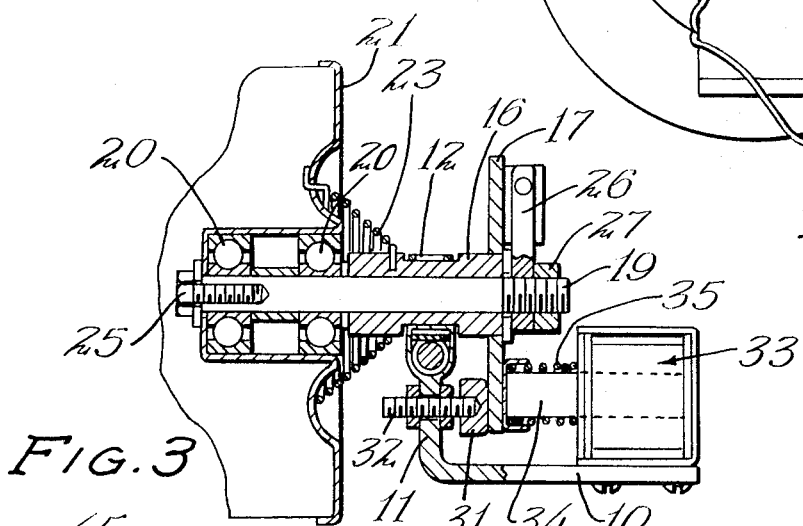
FIG. 3 is a sectional view showing the manner in which the fan is resiliently connected to the operating device for operating the switch.

An arm 26 is mounted upon the shaft 19 for rotation therewith, and is held in position by suitable lock nuts 27. The arm 26 is movable between a pair of switches 29 and 30 which are mounted upon the disc 17. When the disc 17 is held stationary and the vehicle is traveling at low speed, movement of the fan in one direction caused by the spring 23, will cause the arm 26 to engage the switch 29 and to close a circuit therethrough. However, rotation of the fan 21 in a clockwise direction as viewed in FIG. 2 of the drawings, caused by an increase in engine speed, will cause the arm to engage the switch 30 and close a second circuit.

As has been stated, the disc 17 is rotatable about the hub 16. A friction stop 31 engages one side of the disc 17, but this stop, by itself, as adjusted by a supporting bolt 32, will not stop the rotation of the disc. A solenoid 33 is supported by the bracket 10, and includes a plunger 34 urged by a spring 35 against the surface of the disc 17 opposite the fixed friction stop 31. In other words, the disc 17 is normally held from rotation about the hub 16 except when the solenoid 33 is energized to retract the plunger 34 to permit rotation of the disc.

When the vehicle is traveling along a highway where the maximum speed limit is, for example, 70 miles per hour, the position of the disc may be manually set. A circuit is closed to the solenoid 33, disengaging the plunger 34 from the disc 17. The car is then driven until the maximum desired speed of 70 miles per hour is reached. The plunger 34 is then released and the disc 17 is locked in a position where a decrease in speed will position the arm 26 in an intermediate position indicated in FIG. 2. If the speed decreases to 60 miles per hour, the arm 26 will energize the switch 29 and a light or other signal will indicate that the speed has been decreased to this extent. If, on the other hand, the speed of the vehicle increases, the arm 26 will actuate the switch 30 and the driver will be immediately notified that the maximum desired speed has been reached.

It will be understood that the fan or propeller 21 is not a positively driven device, and accordingly, even though the car is operated at a speed far in advance of the predetermined maximum, no injury will result, as the fan will merely be held from further rotation. However, once the maximum speed has been reached, a signal will be sounded or indicated, and the driver will have the opportunity of realizing that the car is traveling above the desired speed.

Figure 4:
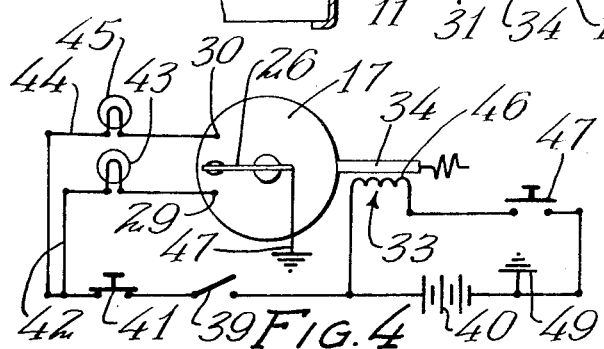
FIG. 4 is a diagrammatic view of the wiring diagram by means of which the device is operated.

FIG. 4 of the drawings indicates diagrammatically the circuit used in the controlling of the device. The disc 17 is illustrated as is the arm 26 connected to the propeller or fan 21. The ignition switch 39 closes a circuit from the battery 40 to a manually controlled switch 41 which is operable to close a circuit 42 to a first signal lamp 43, and to also close a circuit 44 to a second signal lamp 45. It will be understood that autible signals may be used in place of the lamps 43 and 45. The arm 26 is connected to ground as indicated at 47. The arm 26 is shown as engageable with a pair of contacts 29 and 30 which in usual practice comprise either physical contact or microswitches Thus, when the ignition switch 39 and the manually operable switch 41 are closed, the arm 26 will close a circuit either to the signal light 43 or to the signal light 45 depending upon the speed of travel. If the speed is between the minimum and the maximum speeds at which the device is set, neither signal light will be illuminated.

The solenoid 33 is actuated by a solenoid coil 46 controlled by the manually operable switch 47 which is usually located on or adjacent the steering wheel of the vehicle. When the switch 47 is closed, the solenoid coil 46 is energized, and the plunger 34 is retracted. While in a retraction position, the speed of the vehicle is increased until it obtains the maximum speed which is desired. The switch 47 is then opened, and the plunger 34 will lock the disc 17 in a preset position. From this point on, the car may travel at a speed of up to perhaps 10 miles per hour less than the maximum speed desired without providing any indication. However, if the speed goes below the predetermined minimum, the switch 29 is actuated and a signal is provided. Similarly, if the speed is increased above the maximum speed desired, the switch 30 will be closed and a warning signal will be illuminated.

In accordance with the patent statutes I have described the principles of construction and operation of my speed indicating device, and while I have endeavored to set forth the best embodiments thereof, I desire to have it understood that obvious changes may be made within the scope of the following claims without departing from the spirit of my invention.

I claim:

1. A vehicle speed indicating device including:

a rotatable member actuated by air pressure the rotative position of which is dependent upon the speed of movement of the vehicle, a shaft supporting said rotatable member and rotatable therewith, a hub secured in fixed relation to the vehicle and through which said shaft extends;

a control arm secured to said shaft and extending generally radially therefrom, a contact member rotatably supported on said hub coaxial with said shaft, circuit actuating means operable by engagement of said control arm with said contact member, means normally holding said contact member from rotation, and driver controlled means for releasing said last named means, whereby when said control arm engages said contact member it may rotate therewith.

2. The structure of claim 1 and in which said rotatably supported contact member includes a pair of members between which said control arm may rotate.

3. The structure of claim 2 and including resilient means urging said control arm in one direction against one of said members.

4. The structure of claim 2 and including signal means controlled by engagement of said control arm against either member of said pair.

5. The structure of claim 1 and in which said means normally holding said contact member from rotation comprises a spring urged plunger.

6. The structure of claim 5 and in which said spring urged plunger is solenoid actuated.

7. The structure of claim 1 and in which rotation of said rotatable member is resiliently resisted.

8. The structure of claim 1 and including signal means controlled by engagement of said control arm with said contact member.

9. The structure of claim 1 and in which said contact member includes a disc.

10. The structure of claim 9 and in which said disc supports a pair of angularly spaced switch means.

* * * * *